US006299535B1

(12) United States Patent
Tanaka

(10) Patent No.: US 6,299,535 B1
(45) Date of Patent: Oct. 9, 2001

(54) METHOD OF PROCESSING INTERACTIVE GAME, PROGRAM PRODUCT AND GAME SYSTEM FOR THE SAME

(75) Inventor: Motoharu Tanaka, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/560,326

(22) Filed: Apr. 28, 2000

(51) Int. Cl.[7] .................................................. A63F 13/00
(52) U.S. Cl. ................................ 463/31; 463/43; 463/1; 463/30; 345/139
(58) Field of Search .............................. 463/1–2, 5–7, 463/30–33, 43, 49, 42

(56) References Cited

U.S. PATENT DOCUMENTS

| | | | |
|---|---|---|---|
| Re. 35,314 | * 8/1996 | Logg | 463/2 |
| 4,569,026 | * 2/1986 | Best | 364/521 |
| 4,752,069 | * 6/1988 | Okada | 273/1 GC |
| 5,358,259 | * 10/1994 | Best | 273/434 |
| 5,393,070 | * 2/1995 | Best | 273/434 |
| 5,393,071 | * 2/1995 | Best | 273/434 |
| 5,393,072 | * 2/1995 | Best | 273/434 |
| 5,405,151 | * 4/1995 | Naka et al. | 273/437 |
| 5,470,080 | * 11/1995 | Naka et al. | 273/437 |
| 5,618,043 | * 4/1997 | McGlew | 273/308 |
| 5,649,862 | * 7/1997 | Sakaguchi et al. | 463/44 |
| 5,752,883 | * 5/1998 | Butcher et al. | 463/43 |
| 6,010,405 | * 1/2000 | Morawiec | 463/33 |
| 6,093,104 | * 7/2000 | Kasahara et al. | 463/30 |
| 6,117,007 | * 9/2000 | Matsuyama et al. | 463/6 |
| 6,117,014 | * 9/2000 | Aoyama et al. | 463/43 |
| 6,126,544 | * 10/2000 | Kojima | 463/31 |
| 6,152,821 | * 11/2000 | Nakagawa et al. | 463/4 |
| 6,168,524 | * 1/2001 | Aoki et al. | 463/31 |

OTHER PUBLICATIONS

Atari Games, Gauntlet™ Instruction Manual, 1987, pp. 1–6.*

* cited by examiner

*Primary Examiner*—Michael O'Neill
*Assistant Examiner*—Scott E. Jones
(74) *Attorney, Agent, or Firm*—Greenblum & Bernstein, P.L.C.

(57) ABSTRACT

A method of processing an interactive game, and a program product and game system for the same, which enables a character other than the player character to act separately from the player character in the game virtual space, sets an event which a character other than the player character can execute when a condition in the progress of the game is satisfied, displays on the screen the existence of that event for the character other than the player character acting separately from the player character when the condition in the progress of the game enabling execution of that event is satisfied, selectively accepts execution of the event displayed on the screen by an operation of the player in the screen display, and selectively executes and displays on the screen the event for the character other than the player character acting separately from the player character in accordance with the acceptance of the selection and execution of that event.

30 Claims, 13 Drawing Sheets

| 421 | 422 | 423 | 424 |
|---|---|---|---|
| SCENARIO BRANCHING POINT | BRANCHING CONDITION | SCENARIO BRANCHED TO | SELECTION CONDITION |
| BRANCHING POINT A | EVENT 1 ENDS | SCENARIO 1 | EXECUTION OF ATE1: "EXECUTED" |
| | | SCENARIO 2 | EXECUTION OF ATE1: "NOT YET EXECUTED" |
| BRANCHING POINT B | EVENT 2 ENDS | SCENARIO 3 | EXECUTION OF ATE2: "EXECUTED" |
| | | SCENARIO 4 | EXECUTION OF ATE2: "NOT YET EXECUTED" |
| BRANCHING POINT C | EVENT 3 ENDS | SCENARIO 5 | EXECUTION OF ATE1: "EXECUTED" |
| | | SCENARIO 6 | EXECUTION OF ATE1: "NOT EXECUTED" |
| ⋮ | ⋮ | ⋮ | ⋮ |

Fig.3

| AT EVENT 401 | CHARACTER COVERED 402 | TITLE 403 | CONDITION FOR MOVING SELECTABLE STATE 404 | CONDITION FOR ENDING SELECTABLE STATE 405 | EXECUTION 406 |
|---|---|---|---|---|---|
| ATE1 | BIBI | "BIBI PERPLEXED" | END OF EVENT α1 (EVENT OTHER THAN ATE) | END OF EVENT α2 EVENT OTHER THAN ATE | EXECUTED |
| ATE2 | GARNET | "GARNET PERSEVERES" | END OF ATE1 | FIGHT WITH ENEMY CHARACTER | NOT EXECUTED |
| ATE3 | CAT | "CAT SAW IT" | PLAYER CHARACTER (HERO) POSITIONED AT MAP b1 | MOVE TO POSITION OTHER THAN MAP b1 | NOT YET EXECUTED |
| ... | ... | ... | ... | ... | ... |

40

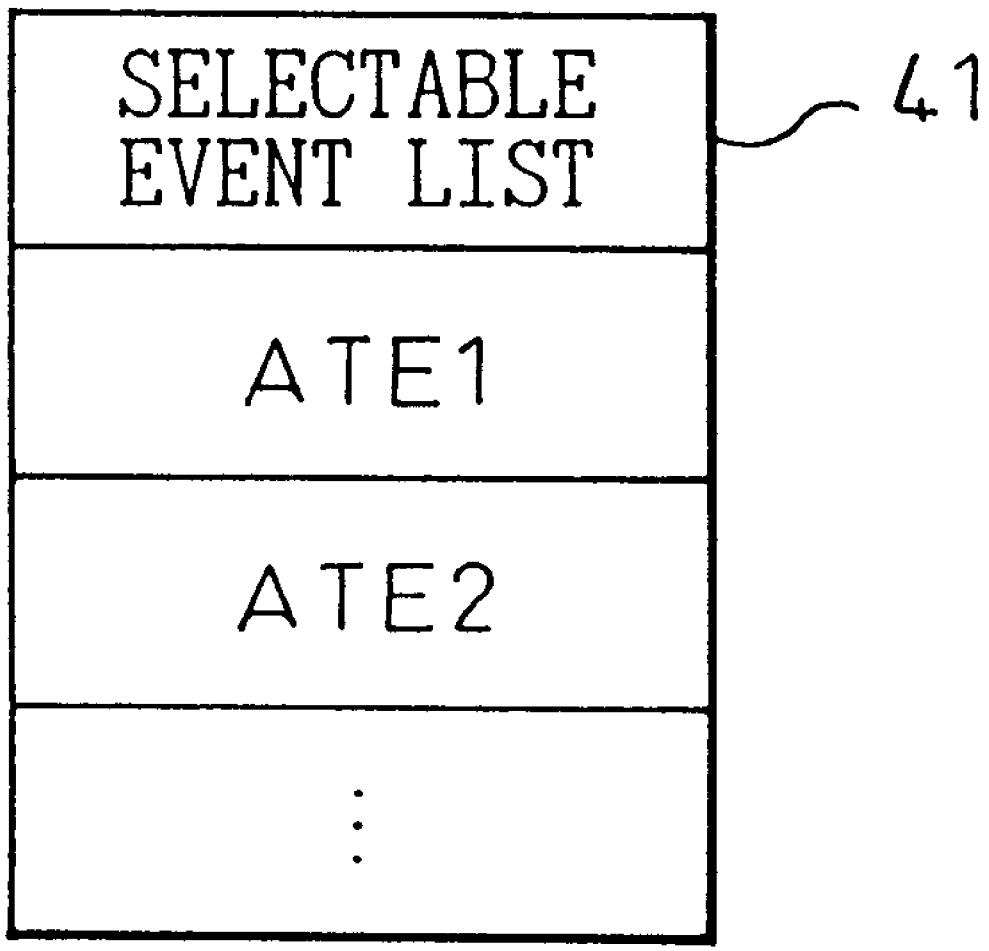

Fig. 5

| SCENARIO BRANCHING POINT | BRANCHING CONDITION | SCENARIO BRANCHED TO | SELECTION CONDITION |
|---|---|---|---|
| BRANCHING POINT A | EVENT 1 ENDS | SCENARIO 1 | EXECUTION OF ATE1: "EXECUTED" |
| | | SCENARIO 2 | EXECUTION OF ATE1: "NOT YET EXECUTED" |
| BRANCHING POINT B | EVENT 2 ENDS | SCENARIO 3 | EXECUTION OF ATE2: "EXECUTED" |
| | | SCENARIO 4 | EXECUTION OF ATE2: "NOT YET EXECUTED" |
| BRANCHING POINT C | EVENT 3 ENDS | SCENARIO 5 | EXECUTION OF ATE1: "EXECUTED" |
| | | SCENARIO 6 | EXECUTION OF ATE1: "NOT EXECUTED" |
| ⋮ | ⋮ | ⋮ | ⋮ |

METHOD OF PROCESSING INTERACTIVE GAME, PROGRAM PRODUCT AND GAME SYSTEM FOR THE SAME

BACKGROUND OF THE INVENTION

1. Field of the Invention

The present invention relates to a method of processing an interactive game and a program product and game system for the same. More particularly, the present invention relates to a game control method of a video game and a computer readable program product storing a program and a video game system for the same. Still more particularly, the present invention relates to a game control method of a video game generating an event in the process of progress of the game, such as a role playing game (RPG), and a computer readable program product storing a program and video game system for the same.

2. Description of the Related Art

There are many types of video games played by video game systems. As one of these, there is the type of video game called a role playing game. In a role playing game, along with progress in the game, various types of events such as fights, encounters, and conversations with enemy characters and discoveries of the same occur in accordance with actions performed by the player character operated by the player in the virtual space during the game. Note that an "enemy character" is a character controlled by the computer in accordance with an action control algorithm in the game.

In a video game of the type called a role playing game, events occur centered around the player character at the location of the player character in the game virtual space and the story unfolds centered around the player character.

Further, in the above video game, in addition to the player character and enemy characters, a large number of friendly characters given different individual characteristics (hereinafter referred to as "friendly characters") appear. In a general video game, the friendly characters form a party with the player character and follow the player character in action. That is, the friendly characters do not act separately from the player character. Therefore, events occur only at locations of the player character in the game virtual space and the story tends to become monotonous.

SUMMARY OF THE INVENTION

An object of the present invention is to provide a game control method of a video game, and a computer readable program product storing a program and a video game system for the same, giving greater diversity to the generation of events, unfolding a story from a multilateral perspective, and thereby enhancing the interest of the game.

To achieve the above object, according to a first aspect of the present invention, there is provided a method of executing an interactive game program giving characters roles in the game and making each character play out its role. The method includes making at least one of the characters play out its role on a screen, preparing in advance one or more events shared by the characters and judging if that one character made to play out its role on the screen has reached the event, switching the role played out from the one character to another character when obtaining the result of judgement that the event has been reached, and making that other character switch to play out its role on the screen.

According to a second aspect of the present invention, there is provided a computer readable program product storing an interactive game program giving characters roles to be played out and making the characters play out their roles. The program makes the computer make at least one of the characters play out its role on a screen, prepare in advance one or more events shared by the characters and judge if that one character made to play out its role on the screen has reached the event, switch the role played out from the one character to another character when obtaining the result of judgement that the event has been reached, and make that other character switch to play out its role on the screen.

According to a third aspect of the present invention, there is provided a game system provided with a unit for execution of a game in accordance with an interactive program giving characters roles in the game and making the characters play out their roles, a memory for storing all or part of the program, and a display screen for displaying the game being executed by the unit. The unit, in accordance with a program stored in the memory, makes at least one of the characters play out its role on a screen, prepare in advance one or more events shared by the characters and judges if that one character made to play out its role on the screen has reached the event. The unit switches the role played out from the one character to another character when obtaining the result of judgement that the event has been reached, and makes that other character switched to play out its role on the screen.

BRIEF DESCRIPTION OF THE DRAWINGS

These and other objects and features of the present invention will become clearer from the following description of the preferred embodiments given with reference to the attached drawings, in which:

FIG. 3 is a view explaining an example of the data configuration of an event management table used in a game by a game control method according to an embodiment of the present invention;

FIG. 4 is a view explaining an example of a selectable event list used in a game by a game control method according to an embodiment of the present invention;

FIG. 5 is a view explaining an example of the data configuration of a scenario branching management table used in a game by a game control method according to an embodiment of the present invention;

DESCRIPTION OF THE PREFERRED EMBODIMENTS

Preferred embodiments of the present invention will be explained below with reference to the drawings.

Figure 1:
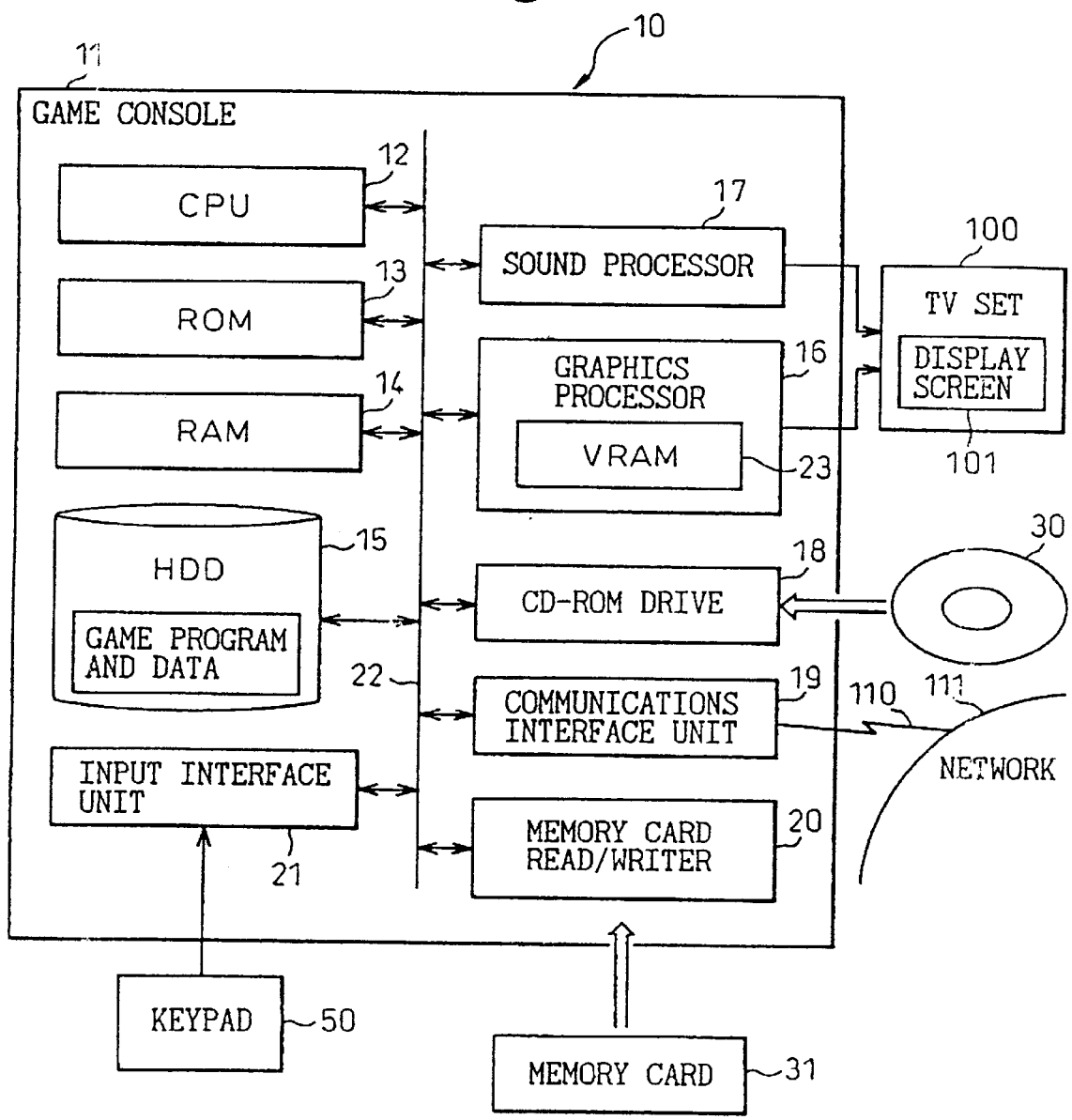
FIG. 1 is a block diagram of an example of the overall configuration of a video game system according to an embodiment of the present invention.

FIG. 1 shows an example of a video game system according to an embodiment of the present invention. The video game system 10 executes a program stored in a computer readable program product according to the present invention and is used for working a game control method according to the present invention.

The video game system 10 is, for example, comprised of a game console 11 and a keypad 50 connected to an input side of the game console 11. A television set 100 having a cathode ray tube (CRT) etc. is connected to an output side of the game console 11 as a monitor with speakers. The keypad 50 is operated by a user (player) for giving user operating instructions to the game console 11. The television set 100 displays a video (image) and outputs sounds in accordance with the content of the game based on a video signal (image signal) or sound signal from the game console 11.

The game console 11 is for example comprised of a central processor (CPU) 12, read only memory (ROM) 13, random access memory (RAM) 14, hard disk drive (HDD) 15, graphics processor 16, sound processor 17, compact disk ROM (CD-ROM) drive 18, communications interface unit 19, memory card read/writer 20, input interface unit 21, and bus 22 for connecting these.

The CPU 12 executes the operating system stored in the ROM 13 to control the game system as a whole. Further, the CPU 12 executes a game program stored in the later explained program storage area 14A of the RAM 14.

Figure 2:
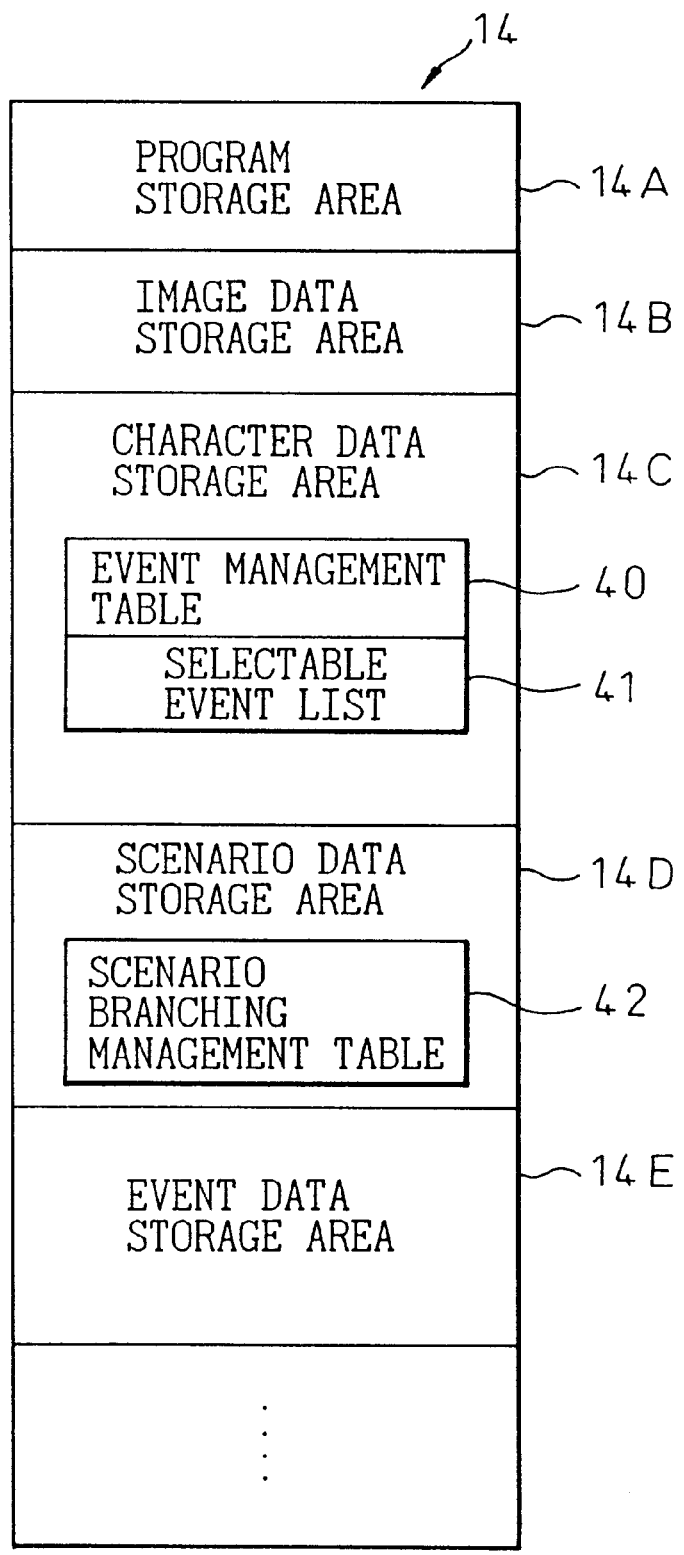
FIG. 2 is a view explaining an example of the memory configuration of a RAM of a video game system for a game by a game control method according to an embodiment of the present invention.

The RAM 14, as shown in FIG. 2, has defined in it a program storage area 14A for storing the game program, an image data storage area 14B for storing the background, characters, and other image data required in the process of execution of the game program, a character storage area 14C, a scenario storage area 14D, an event data storage area 14E, etc.

The RAM 14 stores the game program and image data read by the CD-ROM drive 18 from the CD-ROM 30 in its different areas. Further, the game program or image data may be stored in the hard disk drive 15.

The graphics processor 16 includes a video RAM (VRAM) 23 and uses the VRAM 23 as a frame buffer. Further, the graphics processor 16 generates a video signal based on the image data stored in the frame buffer based on commands from the CPU 12 along with execution of the program and outputs the video signal to the television set 100. Due to this, an image is displayed based on the image data stored in the frame buffer on the display screen 101 of the television set 100.

The sound processor 17 has the function of generating background music, sound effects, and other sound signals. The sound processor 17 generates a sound signal based on data stored in the RAM 14 in accordance with a command from the CPU 12 along with execution of the program and outputs it to the television set 100.

The CD-ROM drive 18 is loaded with a program product, that is, a CD-ROM 30. The CD-ROM drive 18 reads the game program, image data, sound data, etc. stored in the CD-ROM 30.

The communications interface unit 19 is connected selectively to the network 111 by a communications line 110 for data communications with other devices.

The memory card read/writer 20 has inserted in it a memory card 31 which stores data on the interim progress of the game, data on the game environment settings, and other saved data.

The computer readable program product according to the present invention is a computer readable program product storing a game program. The computer readable program product is comprised of a CD-ROM 30 or hard disk 15. The program product stores a program for executing the following processing in a computer. That is, a video game system for executing the program stored in the program product executes the processing relating to an action of the player character designated in accordance with operational input by the keypad 50. Further, the video game system generates an event prepared in advance in accordance with processing relating to an action of the player character and plays out the generated event on the displayed screen.

Further, the video game system enables a character other than the player character to act separately from the player character in the game virtual space. Further, the video game system sets executable events for a character other than the player character when the condition for progress in the game has been satisfied. When the condition for progress in the game enabling execution of an event is satisfied, the video game system displays on the screen the existence of events for a character other than the player character acting separately from the player character.

The video game system selectively waits for execution of an event displayed on the screen by an operation of the player on the screen display and selectively executes and displays on the screen an event for a character other than the player character acting separately from the player character in accordance with the receipt of the selective execution of the event. Further, the video game system changes the content of the progress of the game in accordance with the execution or non-execution of an event for a character other than the player character acting separately from the player character.

The character other than the player character acting separately from the player character is for example a character breaking off from the party of the player character and acting separately at a separate location from the player character. This character will hereinafter be referred to as a "break-off character".

Here, when the break-off character acts separately from the player character at a separate location, the break-off character is not displayed in the screen showing the action of the player character. In the present embodiment, while the action of the player character is being displayed, the action of the break-off character is not being processed. Processing relating to the action of the break-off character is performed during the execution of an event relating to the break-off character. Note that it is also possible to sequentially process the action of the break-off character while displaying the action of the player character.

Whether a character included in the party should take separate action from the player character at a separate location may be determined in accordance with the game story. For example, a character included in the party of the player character may break off and take separate action from the player character at a separate location when a certain event ends. In this case, after the player operates the player character to proceed with the game and another event ends, the broken off characters rejoin the party.

This break-off character operates in accordance with an action control algorithm of the character included in the game program.

Note that the break-off character may also be freely set by the player. Further, the break-off character may be made to freely rejoin the party of the player character by an operation by the player.

Further, each character is given a role in the game. The display screen displays the characters playing out their assigned roles. The video game system makes the player character play out its role in response to operational input from the player. Further, the video game system makes a break-off character play out its role in accordance with a role predetermined by the program. Note that depending on the scene, the video game system sometimes makes the player character play out a role in accordance with a role predetermined by the program. Further, it is also possible to have it make a break-off character play out its role in response to an operational input of the player.

Next, the memory configuration of the RAM 14 when the video game system 10 executes a program will be explained. FIG. 2 schematically shows an example of the memory configuration of the RAM 14.

As shown in FIG. 2, the RAM 14 is divided into for example a program storage area 14A, an image data storage area 14B, a character storage area 14C, a scenario data storage area 14D, an event data storage area 14E and other storage areas. The program storage area 14A is an area for storing a program loaded from the CD-ROM 30 etc. The image data storage area 14B is an area for storing the images of characters in the game, the image of the background of the game, etc.

The character data storage area 14C stores information relating to the generation of an event relating to a character. In the example of FIG. 2, the character data storage area 14C stores an event management table 40 and a selectable event list 41. Further, the scenario data storage area 14D of the RAM 14 stores information for determining the scenario in a game. In the example of FIG. 2, the scenario data storage area 14D stores a scenario branching management table 42.

Next, the contents of the various tables stored in the character data storage area 14C and the scenario data storage area 14D are discussed.

First, the event management table 40 stored in the character data storage area 14C will be explained. FIG. 3 shows an example of the data configuration of the event management table 40. The event data storage area 14E of the RAM 14 stores data relating to various types of events. For example, it stores event data relating to the player character and data of events relating to break-off characters. An event relating to a break-off character can be executed when a condition in the progress of the game is satisfied. From here, such an event (event relating to a character other than the player character which can be executed when a condition in the progress of the game is satisfied) will sometimes be called an "active time event" or an "AT event" in short.

A "condition in the progress of the game" means when a character playing out its role on the screen (for example, the player character) reaches an event prepared in advance (timing of generation of AT event). For example, it is judged that an AT event has been reached when the player character reaches a predetermined point reachable in an area of action of the player character. The area, for example, forest, town, etc., in the gaming world, means the virtual space in which the character can move.

The event management table 40 defines conditions enabling execution of AT events. For example, the event management table 40, as shown in FIG. 3, is structured with a column 401 storing call-up codes of AT events, a column 402 storing characters covered set for each AT event, a column 403 storing titles for displaying the screen of AT events, a column 404 for storing conditions of moving to selectable states, a column 405 for storing conditions for ending selectable states, and a column 406 showing if AT events have been executed or not.

The AT event callup code column 401 stores for each AT event the callup code set for each event. In the example of FIG. 3, it stores "ATE1", "ATE2", and "ATE3".

The CHARACTER COVERED column 402 stores for each AT event the name of the character playing out the central roles in each event. In the example of FIG. 3, "BIBI" is stored linked with the "ATE1", "GARNET" is stored linked with the "ATE2", and "CAT" is stored linked with the "ATE3".

The TITLE column 403 of the event management table 4 stores for each AT event the title of each event. In the example of FIG. 3, "BIBI perplexed" is stored linked with the "ATE1", "GARNET PERSEVERES" is stored linked with the "ATE2", and "CAT SAW IT" is stored linked with the "ATE3".

The CONDITION FOR MOVING TO SELECTABLE STATE column 404 of the event management table 40 sets for each AT event the condition in the progress of the game enabling the execution of the AT event. As the condition, there is the end of an event other than the AT event, for example, an event relating to the player character, the end of another AT event, movement of a player character to a special position (location) in the game virtual space, etc. When the condition is satisfied, the corresponding callup code of the AT event is written in the selectable event list 41 such as shown in FIG. 4.

The condition for moving to a selectable state of an AT event is a condition for determining if a preset event (position at which role of break-off character is set on time axis in game) is reached. The preset event spoken of here is both an event in the role of the player character and an event in the role of another break-off character. That is, the preset event is an event shared by a plurality of characters. For the player character, the event defines the timing for switching the screen display to another character. For a break-off character, the event defines the timing for displaying that character on the screen.

In the example of FIG. 3, the condition for moving to the selectable state of "ATE1" is the end of an event (AT α1) other than the AT event. The condition for moving to the selectable state of "ATE2" is the end of the AT event "ATE1". The condition for moving to the selectable state of "ATE3" is the movement of the position of the player character to a specific map (map b1). Here, "movement of a map in the game" means switching of the image of the background etc. showing the environment in which the player character is placed. For example, when the character moves from a map of a city to a map of the forest, the background image changes from an image showing streets to an image showing trees.

The column 405 storing conditions for ending selectable states of the event management table 40 sets for each AT event the condition in the progress of the game disabling execution of an AT event. As this condition, there is for example the end of an event other than the AT event, for example, an event relating to the player character, a fight with an enemy character, movement of the player character to a position other than a specific position (location) in the game virtual space, etc. If this condition is satisfied, the corresponding callup code of the AT event is deleted from the selectable event list 41 shown in FIG. 4.

In the example of FIG. 3, the condition for the end of the selectable state of the "ATE1" is the end of an event other than the AT event (event α2). The condition for the end of the selectable state of the "ATE2" is a fight of the player character with an enemy character. The condition for the end of the selectable state of the "ATE3" is movement of the position of the player character to a map other than a specific map (map b1).

The column 406 storing the state of execution of AT events of the event management table 40 sets for each AT event one of three types of flags: "EXECUTED", "NOT YET EXECUTED", and "NOT EXECUTED". "EXECUTED" indicates that the AT event has been executed. "NOT YET EXECUTED" indicates that the condition of the CONDITION FOR MOVING TO SELECTABLE STATE column 404 has not yet been satisfied and therefore the event has not yet been executed. "NOT EXECUTED" indicates that the event has not been executed despite the condition of the CONDITION FOR MOVING TO SELECTABLE STATE column 404 being satisfied. A "NOT EXECUTED" AT event subsequently can no longer be executed.

In the example of FIG. 3, the state of execution of the "ATE1" is "EXECUTED", the state of execution of the "ATE2" is "NOT EXECUTED", and the state of execution of the "ATE3" is "NOT YET EXECUTED".

Note that each AT event in the event management table 40 is managed on the same time axis defined following the progress of the game. The roles to be played out by the characters are defined on that same time axis. That is, a plurality of characters in the game are managed on the same time axis. Further, roles to be played out by the characters are set in accordance with times on the time axis. For a break-off character, the content of the role to be played out on the same time axis is stored in advance. The player character is made to play out its role in response to an operational input of the player.

Next, the selectable event list 41 will be explained. FIG. 4 shows an example of the data configuration of the selectable event list 41. The selectable event list 41 is a list of the selectable, that is, executable, AT events. The names of the AT events listed in the selectable event list 41 are displayed on the screen. In the example of FIG. 4, "ATE1", "ATE2", etc. are stored in the selectable event list.

The content of the selectable event list 41 is sequentially updated along with the progress of the game. An AT event is added to the selectable event list 41 when the AT event satisfies the condition of the column 404 for storing conditions for moving to selectable states of the event management table. An AT event is deleted from the selectable event list 41 when the event satisfies the condition of the 405 for storing conditions for ending selectable states of the event management table 40 or is executed.

Next, the scenario branching management table 42 will be explained. FIG. 5 shows an example of the data configuration of the scenario branching management table 42. The scenario branching management table 42 defines the content of the change to be given to the progress of the game in accordance with execution or non-execution of the AT event. The scenario branching management table 42, as shown in FIG. 5, is structured with a column 421 for storing the names of the scenario branching points, a column 422 for storing the scenario branching conditions, a column 423 for storing the names of the branchable scenarios, and a column 424 for storing the condition for selection of each branching scenario. A plurality of scenario branching points are set in a game. In the present embodiment, for example, the scenario branching point is set conditional on the end of a predetermined event.

The column 421 for storing the names of the scenario branching points stores identification codes of the scenario branching points. In the example of FIG. 5, "BRANCHING POINT A", "BRANCHING POINT B", and "BRANCHING POINT C" are stored.

The column 422 for storing scenario branching conditions of the scenario branching management table 42 sets the condition for scenario branching for each scenario branching point. In the example of FIG. 5, the branching condition for the "BRANCHING POINT A" is the end of "EVENT 1", the branching condition for the "BRANCHING POINT B" is the end of "EVENT 2", and the branching condition for the "BRANCHING POINT C" is the end of "EVENT 3".

For example, the column 423 for storing names of branchable scenarios of the scenario branching management table 42 lists in parallel the names of two branchable scenarios for each scenario branching point. In the example of FIG. 5, the branchable scenarios corresponding to the "BRANCHABLE POINT A" are the "SCENARIO 1" and "SCENARIO 2", the branchable scenarios corresponding to the "BRANCHABLE POINT B" are the "SCENARIO 3" and "SCENARIO 4", and the branchable scenarios corresponding to the "BRANCHABLE POINT C" are the "SCENARIO 5" and "SCENARIO 6".

The column 424 storing the condition for selection for each branching scenario for example sets opposite conditions for selection for the two branchable scenarios generated at an event branching point. The selection condition is a combination of "EXECUTED" and "NOT YET EXECUTED" and "EXECUTED" and "NOT EXECUTED" for a certain single AT event.

In the example of FIG. 5, the "SCENARIO 1" is selected when the state of execution of the ATE1 when the "EVENT 1" ends is "EXECUTED", the "SCENARIO 2" is selected when the state of execution of the ATE1 when the "EVENT 1" ends is "NOT YET EXECUTED", the "SCENARIO 3" is selected when the state of execution of the ATE2 when the "EVENT 2" ends is "EXECUTED", the "SCENARIO 4" is selected when the state of execution of the ATE2 when the "EVENT 2" ends is "NOT YET EXECUTED", the "SCENARIO 5" is selected when the state of execution of the ATE1 when the "EVENT 3" ends is "EXECUTED", and the "SCENARIO 6" is selected when the state of execution of the ATE1 when the "EVENT 3" ends is "NOT EXECUTED".

In this way, when for example the event 1 ends, a branching point A of the scenario is generated and one of the scenario 1 and scenario 2 is selected depending on whether the AT event 1 has been executed or not. This means that the progress of the game is changed in content depending on whether an AT event is executed.

Next, the operation of the video game system 10 according to the present embodiment will be explained in more detail.

At startup, the CPU 12 reads the program and data required for execution of the game through the CD-ROM drive 18 from a computer readable program product, that is, the CD-ROM 30, based on the operating system stored in the ROM 13 and transfers the same to the RAM 14 and hard disk drive 15.

The CPU 12 executes the program transferred to the RAM 14 so as to perform various types of processing for progress of the game explained below.

Note that some of the control operations performed by the video game system 10 include actual control performed by devices other than the CPU 12 together with the CPU 12. Here, for convenience in explanation, the control which has something to do with the CPU 12 is deemed direct control by the CPU 12 for simplification of the explanation.

Further, the program and data required for execution of the game are successively read from the CD-ROM 30 and transferred to the RAM 14 in accordance with the state of progress of processing along with commands from the CPU 12. In the following explanation, however, to facilitate the understanding of the present embodiment, a detailed explanation of the reading of data from the CD-ROM 30 and transfer of the data to the RAM 14 is omitted.

Figure 6:
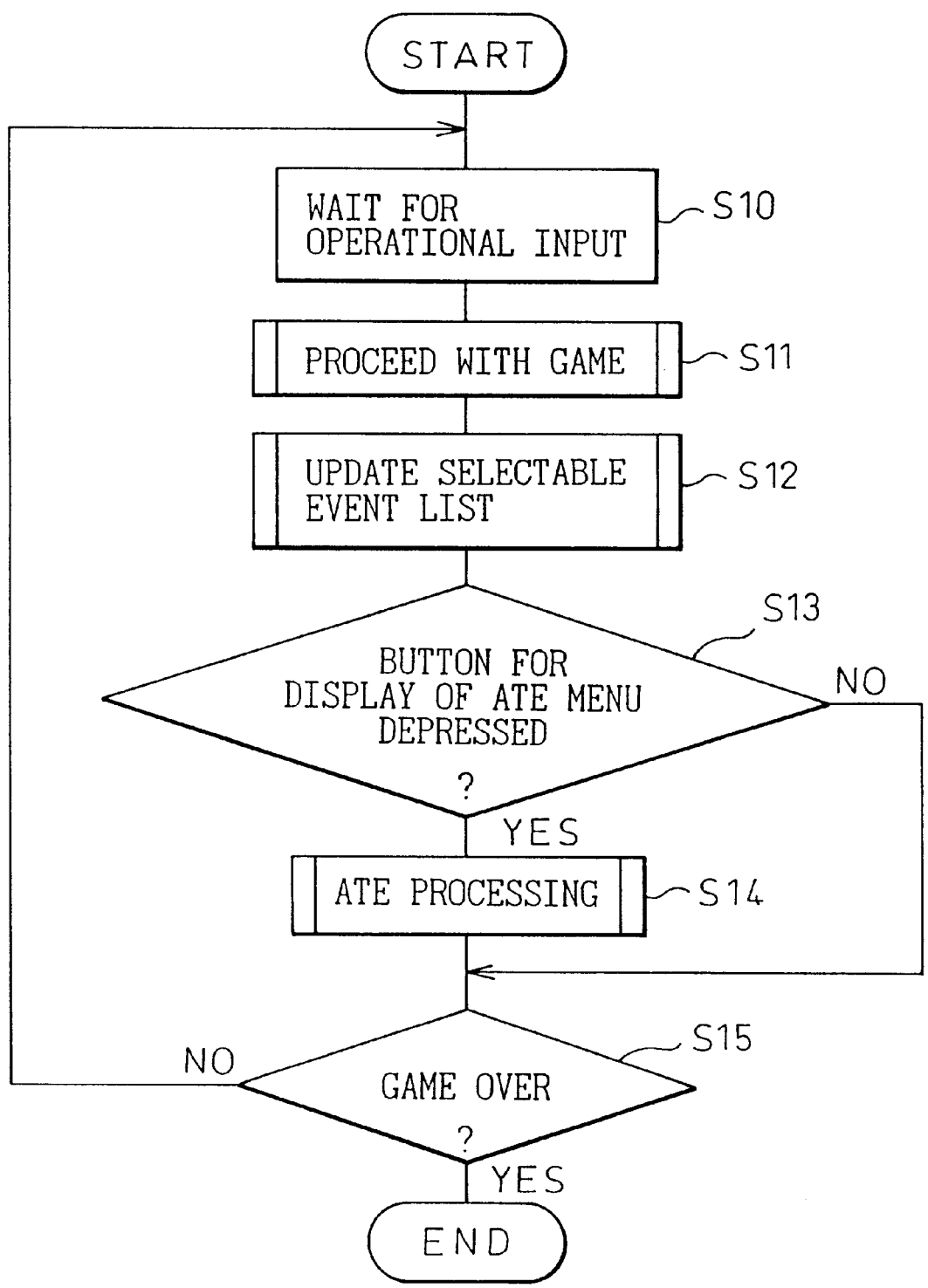
FIG. 6 is a flowchart of the overall flow of a game by a game control method according to an embodiment of the present invention.

FIG. 6 shows the overall flow of a game according to the game control method according to the present embodiment.

First, the CPU 12 waits for an operational input from the keypad 50 (step S10). The operational input here includes movement of the player character and other input relating to progress of the game.

Figure 7:
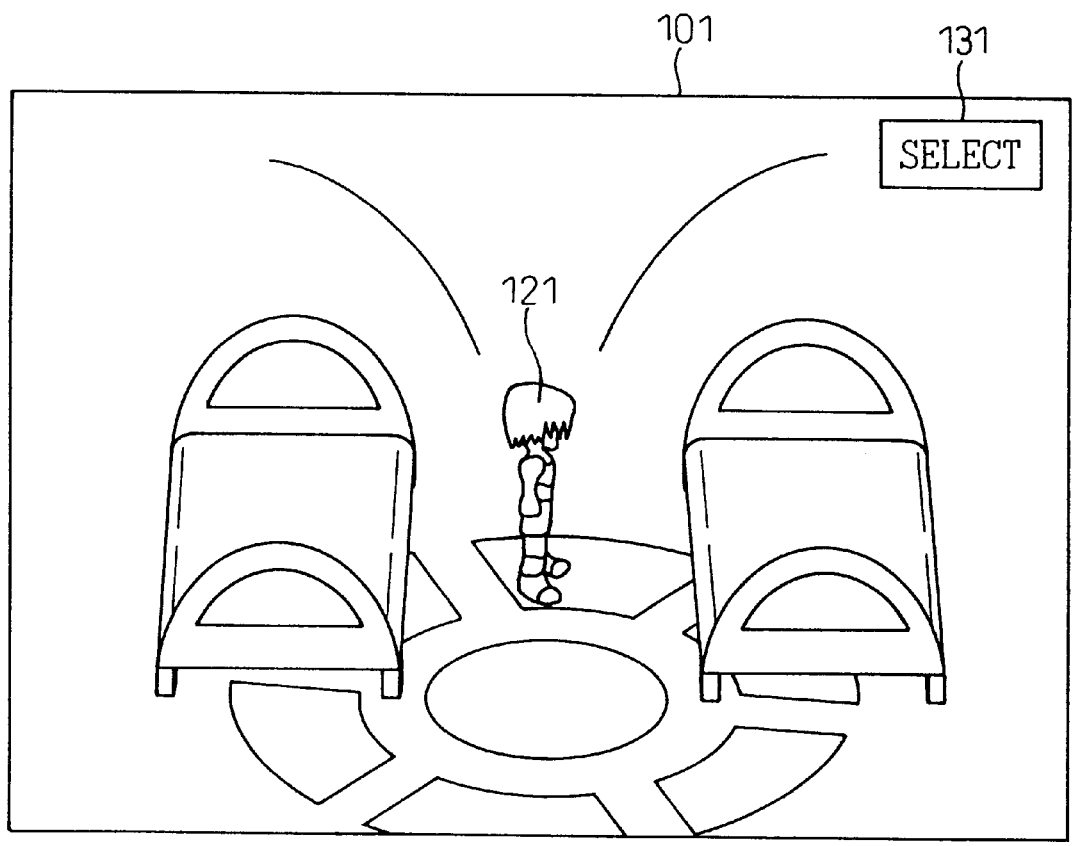
FIG. 7 is a view of an example of the displayed screen in the case where there is a selectable event.

When an operational input from the keypad 50 is received, the CPU 12 performs processing for progress in the game (step S11). In the processing for progress of the game, processing is performed relating to events such as fights between the player character and an enemy character. When the processing for game progress is ended, the selectable event list 41 (see FIG. 4) is updated in accordance with the progress in the game (step S12). If there is a single selectable event in the selectable event list 41, a message indicating that is displayed on the screen along with an audio warning. FIG. 7 is a view of an example of the displayed screen when there are one or more selectable events. The display screen 101 of FIG. 7 displays a player character 121 standing in a building. The top right of the screen displays a message 131 indicating the existence of a selectable event. In the example of FIG. 7, the message "SELECT" is displayed, In this case, the SELECT button provided on the keypad 50 is used for display of the AT event (ATE) menu. When the SELECT button is depressed by operational input of the player (step S13), AT event (ATE) processing is performed (step S14). After the end of the ATE processing, it is judged if the game has ended (step S15). If the SELECT button is not depressed, the routine proceeds to step S15 without the AT event (ATE) processing. If the result of the judgement of the end of the game is that the game has ended, the processing is ended. If it is that the game has not ended, operational input from the keypad 50 is again awaited (step S10) and similar processing repeated.

Note that when it is judged at step S13 that the SELECT button has not yet been depressed, the AT event processing is performed and it is judged if the game has ended (step S15).

Figure 8:
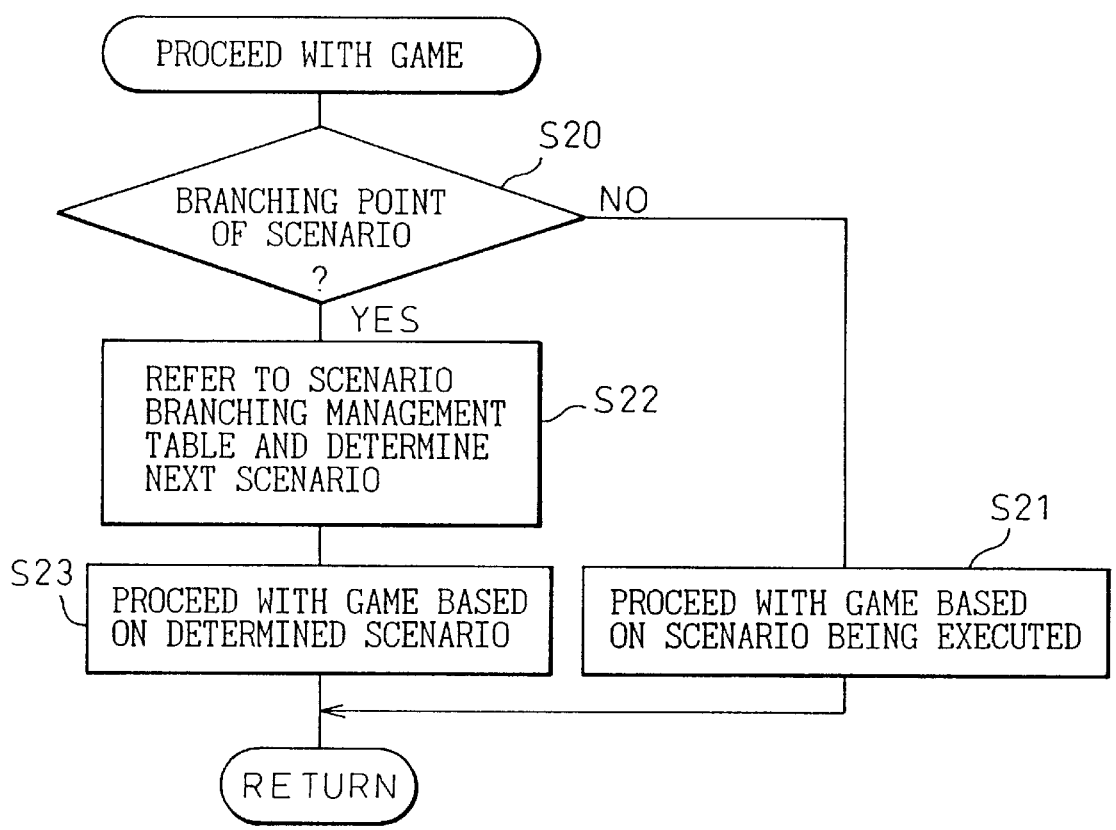
FIG. 8 is a flowchart of a routine for processing for progress of the game in a game by a game control method according to an embodiment of the present invention.

FIG. 8 shows an exemplary routine of the processing for game progress (step S11). In the routine of the processing for game progress, the CPU 12 refers to the scenario branching management table 42 and judges if the scenario branching point has been reached along with progress in the game (step S20).

This judgement is if a scenario branching condition set in the column 422 storing scenario branching conditions of the scenario branching management table 42 has been satisfied or not. If none of the branching conditions has been satisfied, the game continues progressing based on the scenario currently being executed (step S21).

As opposed to this, when any of the branching conditions has been satisfied, at step S22 the content of the column 422 storing the scenario selection conditions of the scenario branching management table 42 is compared against the flag of the column 406 storing the states of execution of AT events of the event management table 40 (see FIG. 3) to determine the branchable scenarios (next scenario). For example, when the branching condition of the "BRANCHING POINT A" has been satisfied, the scenario branching management table 42 is referred to and the branchable scenarios ("SCENARIO 1" and "SCENARIO 2") of the "BRANCHING POINT A" are detected. Further, the column 406 storing the states of execution of the event management table 40 is referred to so as to judge if the scenario selection condition of an event has been satisfied. The game then proceeds based on the determined scenario (step S23). After steps S23 and S24, the logic returns to the flow in FIG. 6.

Due to this, the content of the progress of the game (scenario) is changed depending on whether the AT event is executed.

Figure 9:
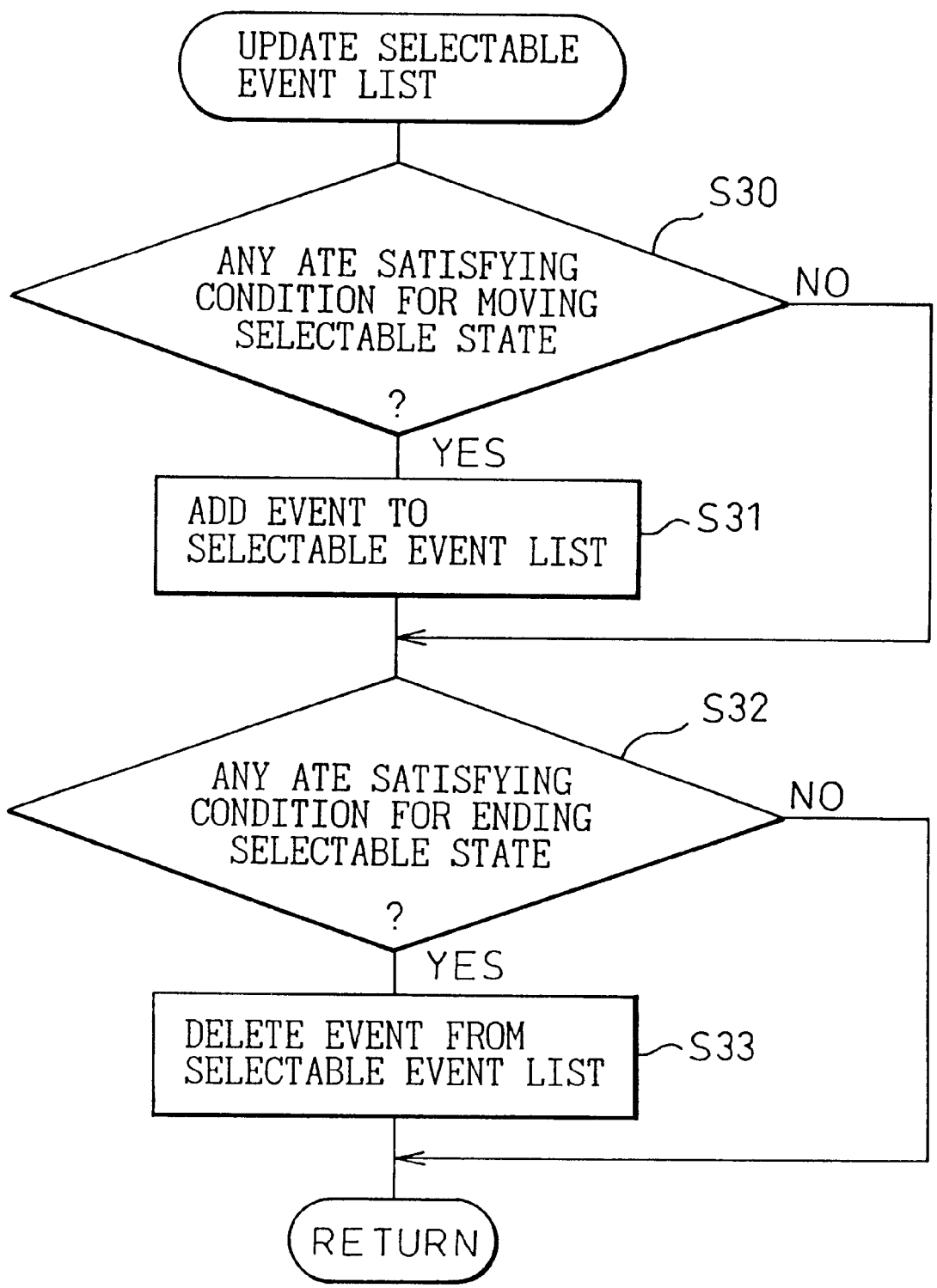
FIG. 9 is a flowchart of a routine for processing for progress of the game in a game by a game control method according to an embodiment of the present invention.

FIG. 9 shows the routine for processing for updating the selectable event list (step S12). In the processing for updating the selectable event list, first, the column 404 storing the conditions for movement to the selectable state of the event management table 40 is referred to so as to judge if there is an AT event (ATE) satisfying the condition for movement to the selectable state (step S30). The processing for judgement is performed independently for each AT event recorded in the event management table 40.

If there is an AT event (ATE) satisfying the condition for movement to the selectable state, the code of that AT event is added to the selectable event list 41 (see FIG. 4) (step S31). For example, when the condition for selection of the "ATE3" shown in FIG. 3 is satisfied, "ATE3" is added to the selectable event list 41. It is judged that an event shared by a plurality of characters (event generating an AT event) has been reached by the selection condition being satisfied.

When there is no AT event satisfying the condition for movement to the selectable state, the processing of step S31 is not performed and the processing proceeds to step S32.

Next, the column 405 storing conditions for ending selectable states of the event management table 40 is referred to so as to judge if that there is an AT event (ATE) satisfying the condition for ending its selectable state (step S32). The processing for judgement is performed independently for each AT event recorded in the event management table 40.

If there is an AT event (ATE) satisfying condition for ending the selectable state, the code of that AT event is deleted from the selectable event list 41 (step S33). Note that at this time if the flag of that AT event in the event management table 40 is "NOT YET EXECUTED", the flag is changed to "NOT EXECUTED". Next, the processing proceeds to step S13 of FIG. 6. Also, when no ATE satisfies the condition for ending the selectable state, the processing proceeds to step S13 of FIG. 6.

Figure 10:
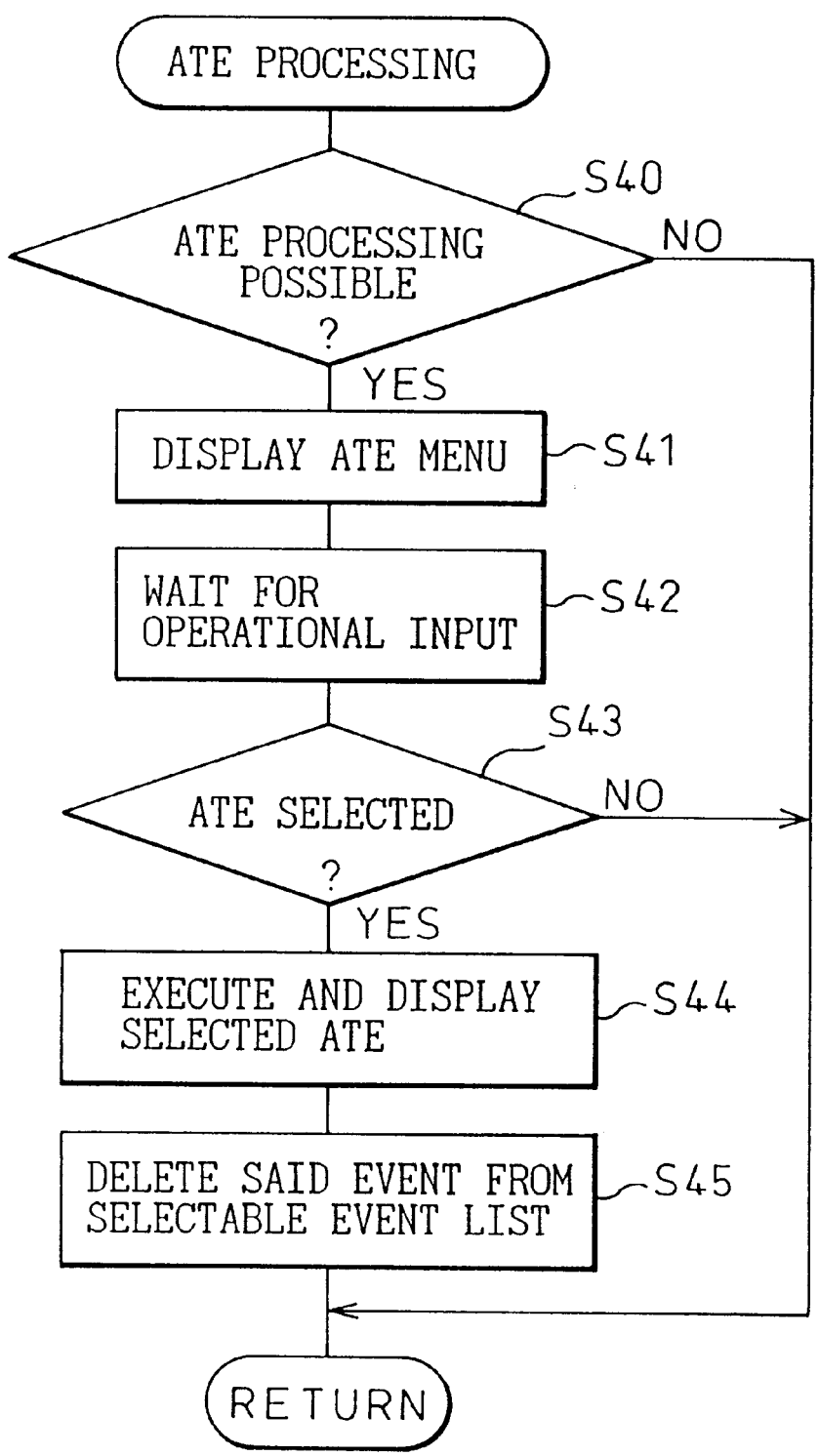
FIG. 10 is a flowchart of a routine for processing for progress of the game in a game by a game control method according to an embodiment of the present invention.

FIG. 10 shows the routine for AT event (ATE) processing (step S14). In the AT event processing routine, first, it is judged if the AT event processing is currently executable (step S40). States where the AT event processing is executable include cases where there is a break-off character, cases where the player character is at a location where the AT event takes place, etc. In these cases, even if the SELECT button of the keypad 50 is depressed, the AT event processing routine ends without the AT event (ATE) menu being displayed on the screen. If the AT event processing routine ends, the processing proceeds to step S15 of FIG. 6.

If the AT event processing is executable, the AT event (ATE) menu is displayed on the screen along with the depression of the SELECT button of the keypad 50 (step S41).

Figure 11:
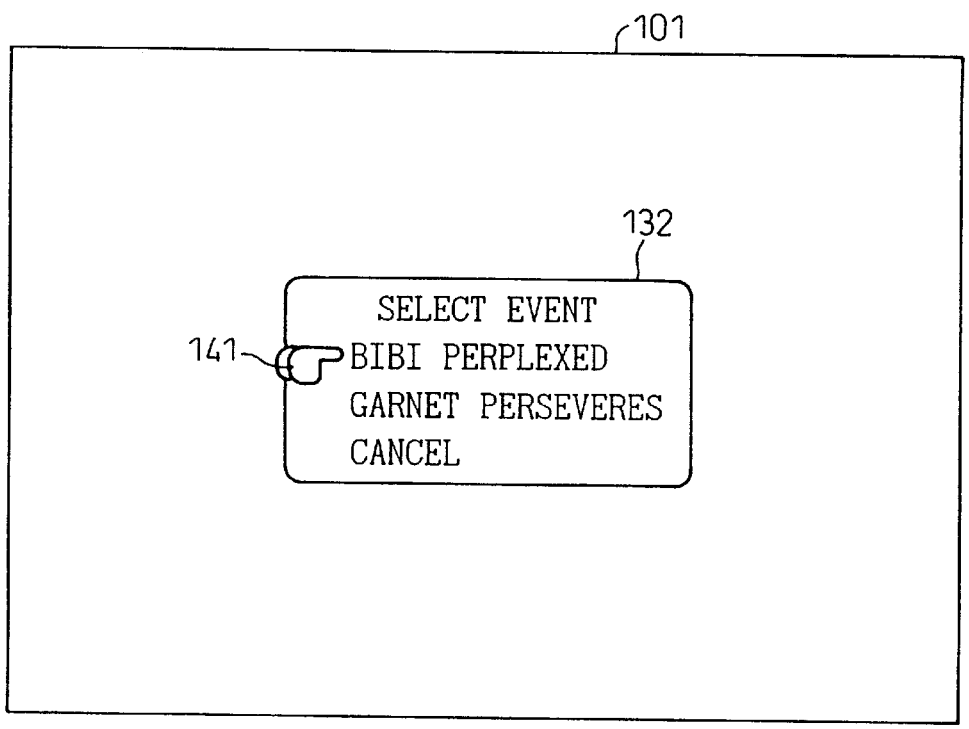
FIG. 11 is a view of an example of a displayed screen on which an AT event menu is displayed.

FIG. 11 shows an example of the display screen on which the AT event menu is displayed. As shown in FIG. 11, the display screen 101 displays the AT event (ATE) menu 132 on the screen. The AT event menu 132 displays by a menu format the names of all AT events listed in the selectable event list 41, for example, "BIBI PERPLEXED", "GARNET PERSEVERES", and "CANCEL". Further, a cursor 141 is displayed to the left of one of the names of the events ("BIBI PERPLEXED" in FIG. 11). The cursor 141 moves up and down in response to operational input from the keypad 50. When the selection confirmation key is depressed by the keypad 50, the event designated by the cursor 141 at that time is selected.

Next, the receipt of an operational input from the keypad 50 is awaited (step S42). For example, key input from the keypad 50 is awaited. When there is an operational input by the keypad 50, the routine proceeds to step S43.

After the processing for receipt of the operational input, it is judged which item on the AT event menu has been selected (step S43). If no ATE is selected, the AT event processing routine ends without the AT event being executed. If the AT event processing routine ends, the processing proceeds to step S15 of FIG. 6. The case where the ATE is not selected is, for example, when "CANCEL" is selected by the cursor 141.

Figure 12:
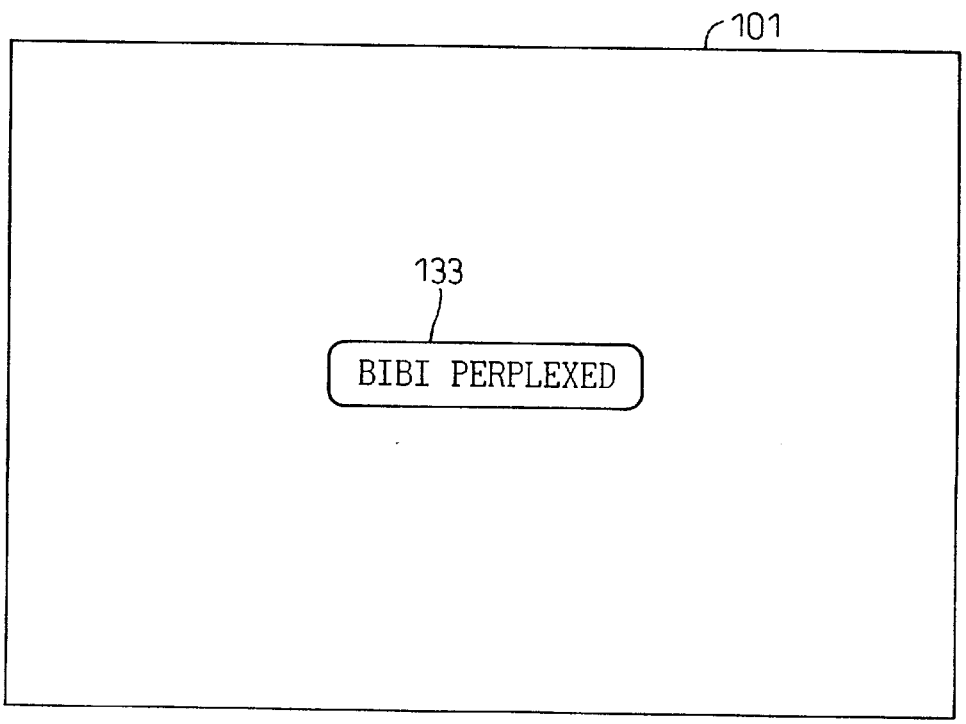
FIG. 12 is a view of an example of a displayed screen when starting an AT event.

As opposed to this, when the name of the AT event, for example, "BIBI PERPLEXED", is selected by the cursor 141 by operational input, the starting menu of the AT event "BIBI PERPLEXED" is displayed. FIG. 12 shows an example of the screen of execution of the AT event. The display screen 101 shown in FIG. 12 shows the title 133 of the AT event. In the example of FIG. 12, the message "BIBI PERPLEXED" is displayed.

Next, the AT event "BIBI PERPLEXED" is executed for the break-off character acting separately from the player character at a separate location. The content of the event being executed is displayed on the screen (step S44).

Figure 13:
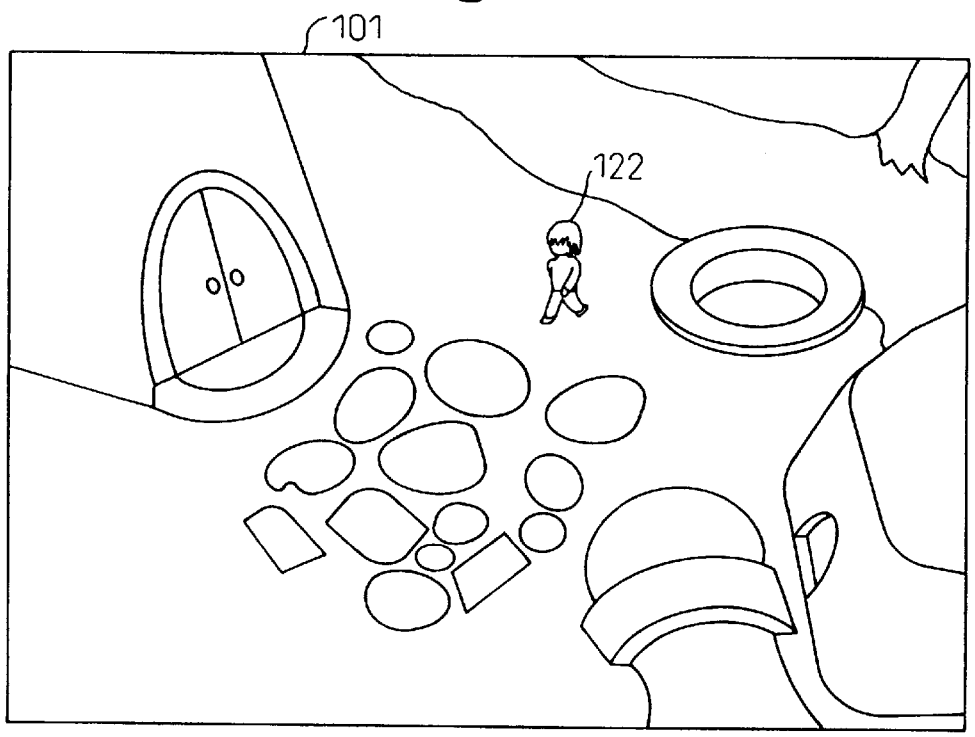
FIG. 13 is a view of an example of a displayed screen during the execution of an AT event.

FIG. 13 is a view of an example of the display screen during the execution of the AT event. When the AT event is executed, a scene separate from the screen before execution is displayed on the display screen 101. The display screen 101 displays a background etc. different from the screen before the start of the AT event (for example, the display screen of FIG. 7). Further, the character 122 named "BIBI" is displayed on the screen. During the execution of the AT event, the action of the character named "BIBI" is displayed on the display screen 101. That is, the character 122 playing out the predefined role is displayed on the display screen 101.

When the AT event ends, the code of that AT event is deleted from the selectable event list 41 (step S45) after which the control returns to step S15 of FIG. 6. For example, if the AT event "ATE1" with the title "BIBI PERPLEXED" is executed, "ATE1" is deleted from the selectable event list 1 shown in FIG. 4.

Further, when the AT event ends, the flag for that AT event in the event management table 40 is changed to "EXECUTED". For example, when the AT event "ATE3" with the title "CAT SAW IT" is executed, the item of the state of execution of the "ATE3" of the event management table 40 shown in FIG. 3 is changed from "NOT YET EXECUTED" to "EXECUTED".

Figure 14:
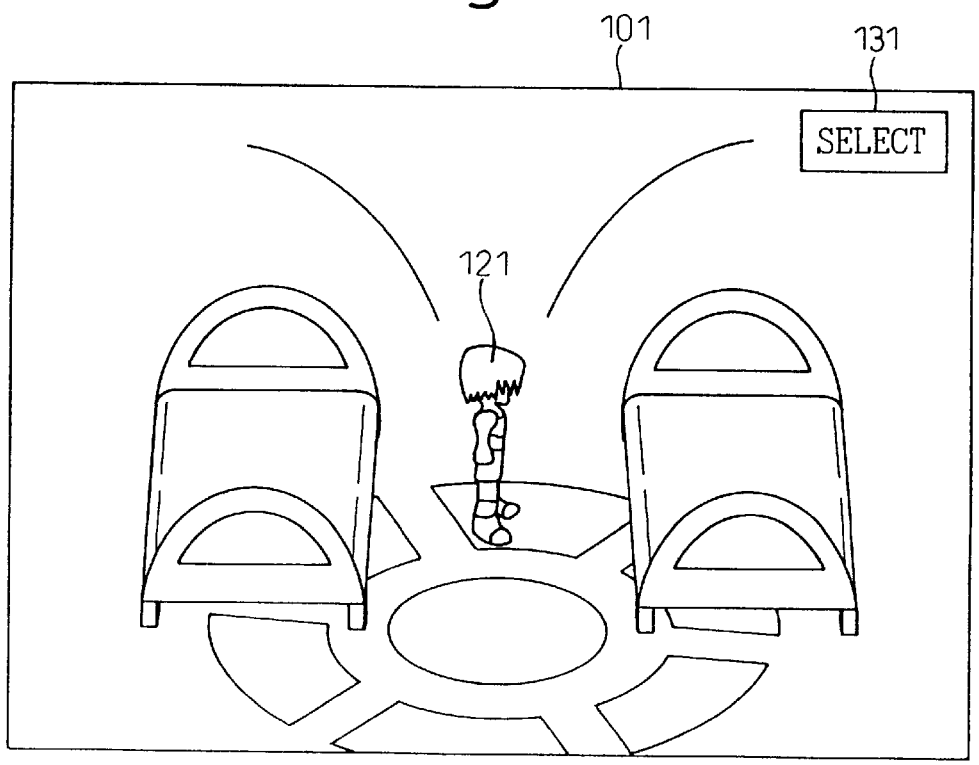
FIG. 14 is a view of an example of a displayed screen after the end of an AT event.

After the end of the AT event, the original image, that is, the screen display of the scene with the player character, is returned to. FIG. 14 shows an example of the display screen after the end of the AT event. The display screen 101 after the end of the AT event displays the player character at the same location as in the screen before the start of the AT event. That is, when an AT event finished being executed, the original state (screen where the player character plays out its role) is restored.

At this time, if there is another AT event in the selectable event list 41, the message "SELECT" is displayed on the screen. In the example of FIG. 14, the AT event "BIBI PERPLEXED" was executed, but the AT event "GARNET PERSEVERES" is still not executed. That is, since there is at least one selectable AT event, the message "SELECT" 131 is displayed at the top right of the display screen 101. Note that another new AT event sometimes becomes selectable by execution of an AT event.

If the SELECT button of the keypad 50 is depressed at this time, the AT event menu screen is again displayed. In this case, a list of the AT events not including the already executed "BIBI PERPLEXED" is displayed on the screen.

Figure 15:
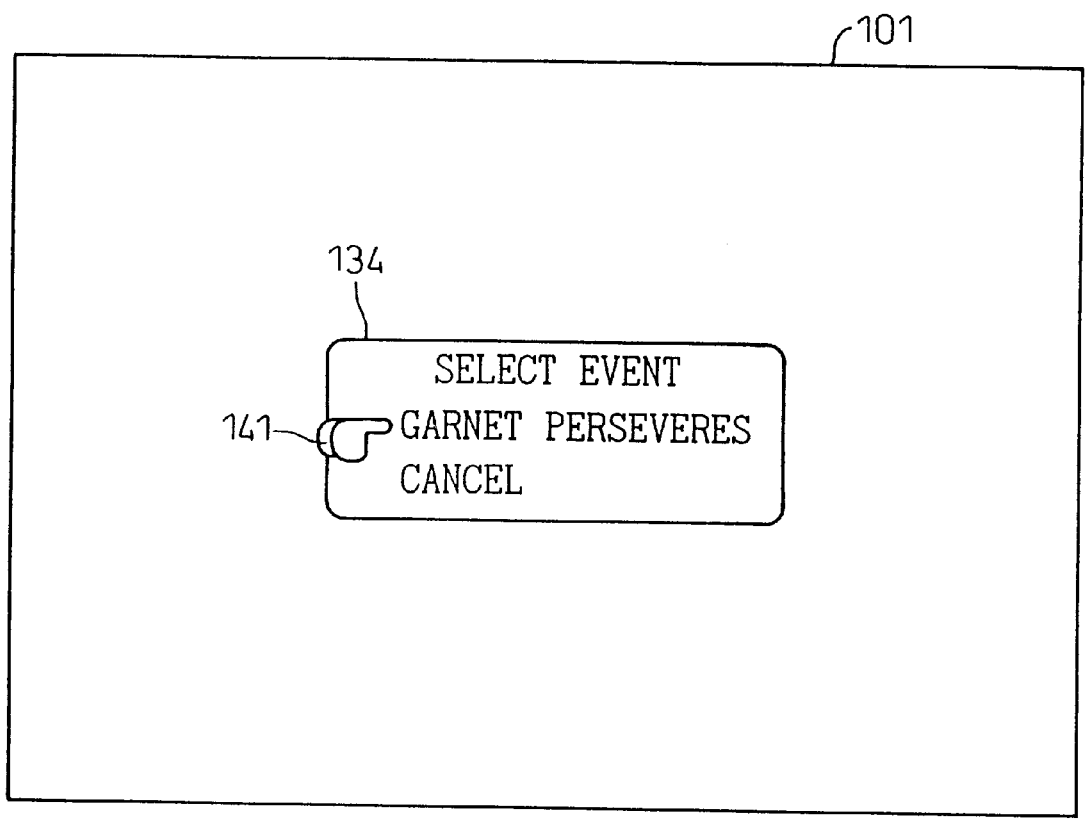
FIG. 15 is a view of an example of a displayed screen showing a change in the AT event menu after the end of an AT event.

FIG. 15 is a view of an example of the display screen displaying a changed AT event menu 134 after the end of an AT event. As shown in FIG. 15, the already executed "BIBI PERPLEXED" is not displayed. Just "GARNET PERSEVERES" and "CANCEL" are displayed on the screen. Due to this, it is possible to continue to see other AT events.

Note that to dynamically promote the progress of the game, it is also possible to prevent the execution of another AT event unless the player character is moved to another location right after the execution of an AT event.

Further, when there is not even one code of an AT event listed in the selectable event list 41, the message "SELECT" is not displayed on the screen and the AT event menu is not displayed on the screen.

Due to the above processing, it is possible to make the party characters individually break off and to combine the generation of AT events by the characters and possible for the player to select at its own will the generation of AT events occurring at other locations at the same time in the virtual space of the game and to view those events over an extended period.

Due to this, it is possible to more deeply imbue the characters with individuality, sentiments, and feelings and possible to enhance the degree to which the feelings of the player are transplanted into each character. In particular, it is possible to enrich the generation of events focusing on characters other than the player character (main character).

Further, it is possible to multilaterally play out a plurality of scenarios simultaneously proceeding with a plurality of characters by switching events. Due to this, the player can experience a plurality of game stories through various characters at the same time and can selectively view events occurring at separate locations at the same time with player involvement in accordance with operational input. Due to this, it is possible to give more depth to the game story and the story world. Further, it is possible to change the ending of the game story based on the selection of the AT events by the player and possible to make the game proceed based on scenarios in line with the thinking of the player.

Further, since a plurality of characters act separately at the same time depending on the AT event, there is no longer a need for the player to move the party led by the player character to collect information etc. The "collection of information" spoken of here means the display on the screen of a conversation between the player character and another character and display on the screen of information useful for an attack in the game.

Note that the game control method explained in the present embodiment may be realized by execution of a prepared program by a personal computer, video game system, etc. The game program according to this game control method is stored in a hard disk, floppy disk, CD-ROM, magneto-optic disk (MO), DVD, or other computer readable program product. The game program is read from the program product by a computer, and the game program executed by the program. Further, the program may be distributed through such a program product or through the Internet or other networks.

Therefore, some program products can be distributed and sold independently from the game system as software products. Further, by use of a computer or other hardware and using this software, it becomes possible to easily work the game technique of the above embodiment by this hardware.

While the invention has been described by reference to specific embodiments chosen for purposes of illustration, it should be apparent that numerous modifications could be made thereto by those skilled in the art without departing from the basic concept and scope of the invention.

For example, the generation of the above AT event is not limited to a role playing game and may be applied to adventure games where a plurality of characters appear, simulation games, and all other games where a plurality of characters appear.

What is claimed is:

1. A method of executing an interactive game program giving a plurality of characters roles in a game and making each character play out an assigned role, comprising:
    making at least one character among the plurality of characters play out a first assigned role and displaying the at least one character on a screen,
    preparing in advance at least one event shared by the plurality of characters and judging if the at least one character playing out the first assigned role on the screen has reached the at least one event,
    switching display of the role played out by the at least one character to another character in the plurality of characters when determining that the at least one event has been reached, and
    making the other character play out a second assigned role and displaying the other character on the screen,
    wherein when the display is switched, the other character playing out the second assigned role is displayed instead of the at least one character playing out the first assigned role.

2. A method as set forth in claim 1, further comprising, after making said other character play out the second assigned role, switching the display back to the at least one character playing out the first assigned role.

3. A method as set forth in claim 1, further comprising making said at least one character play out the first assigned role in response to an operation by a player.

4. A method as set forth in claim 1, further comprising making said other character play out the second assigned role in response to an operation by a player.

5. A method as set forth in claim 1, further comprising rendering a judgement that the at least one event has been reached when the at least one character reaches a point able to be reached in the at least one character's range action.

6. A method as set forth in claim 1, further comprising rendering a judgement that the at least one event has been reached when the other character is made to play out the second assigned role.

7. A method as set forth in claim 1, further comprising, when the at least one event has been reached, selecting the other character in response to an operation by a player and making the selected character play out the second assigned role.

8. A method as set forth in claim 7, in which the selecting further comprises, displaying a menu showing the selectable characters and selecting one of the selectable characters from the menu in response to the operation by the player.

9. A method as set forth in claim 1, further comprising managing said plurality of characters on a single time axis and, when switching the display from the first assigned role played out from the at least one character to the other character, making the other character play out the second assigned role in accordance with the second assigned role to be played out on the same time axis.

10. A method as set forth in claim 9, further comprising storing in advance the second assigned role to be played by the other character on the same time axis.

11. A computer readable program product storing an interactive game program giving a plurality of characters roles to be played out and making the characters play out their roles,
    said program comprising:
        making at least one character among the plurality of characters play out a first role and displaying the at least one character playing out the first role on a screen,
        preparing in advance at least one event shared by the plurality of characters and judging when the at least one character playing out the first role on the screen has reached the at least one event,
        switching display of the role played out by the at least one character on the screen to another character in the plurality of characters when obtaining a result of judgement that the event has been reached, and
        making the other character play out a second role and displaying the other character on the screen,
        where in when the display is swithched, the other character playing out the second assigned role is displayed instead of the at least one character playing out the first assigned role.

12. A program product as set forth in claim 11, said program further comprising, after making said other character play out the second role, switching the display back to the at least one character playing out the first role.

13. A program product as set forth in claim 11, said program further comprising making said at least one character play out the first role in response to an operation by a player.

14. A program product as set forth in claim 11, said program further comprising making said other character play out the second role in response to an operation by a player.

15. A program product as set forth in claim 11, said program further comprising rendering a judgement that the at least one event has been reached when the at least one character reaches a point able to be reached in the at least one character's range of action.

16. A program product as set forth in claim 11, said program further comprising rendering a judgement that the at least one event has been reached when the other character is made to play out the second role.

17. A program product as set forth in claim 11, said program further comprising, when the at least one event is reached, selecting the other character in response to an operation by a player and making that selected character play out the second role.

18. A program product as set forth in claim 17, in which the selecting further comprises displaying a menu showing the selectable characters and selecting one of the selectable characters from the menu in response to the operation by a player.

19. A program product as set forth in claim 11, said program further comprising managing said plurality of characters on a single time axis and, when switching the display from the role played out from the at least one character to the other character, making the other character play out the second role in accordance with the second role to be played out on the same time axis.

20. A program product as set forth in claim 19, said program further comprising storing in advance the second role to be played by the other character on the same time axis.

21. A game system comprising:
a unit for execution of a game in accordance with an interactive program giving a plurality of characters roles in the game and making the characters play out their roles,
a memory for storing all or part of the program, and
a display screen for displaying the game being executed by the unit,
the unit,
in accordance with the program stored in the memory,
making at least one character among the plurality of characters play out a first assigned role and displaying the at least one character on a screen,
preparing in advance at least one event shared by the plurality of characters and judging if the at least one character playing out the first assigned role on the screen has reached the at least one event,
switching display of the role played out by the at least one character to another character in the plurality of characters when determining that the at least one event has been reached, and
making the other character play out a second assigned role and displaying the other character on the screen,
wherein when the display is swithched, the other character playing out the second assigned role is displayed instead of the at least one character playing out the first assigned role.

22. A game system as set forth in claim 21, said unit further, after making said other character play out the second role, switching the display back to the at least one character playing out the first role.

23. A game system as set forth in claim 21, said unit further making said at least one character play out the first role in response to an operation by a player.

24. A game system as set forth in claim 21, said unit further making said other character play out the second role in response to an operation by a player.

25. A game system as set forth in claim 21, said unit further rendering a judgement that the at least one event has been reached when the at least one character reaches a point able to be reached in the at least one character's range of action.

26. A game system as set forth in claim 21, said unit further rendering a judgement that the at least one event has been reached when the other character is made to play out the second role.

27. A game system as set forth in claim 21, said unit further, when the at least one event is reached, selecting the other character in response to an operation by a player and making that selected character play out the second role.

28. A game system as set forth in claim 27, in which the selecting further comprises displaying a menu showing the selectable characters and selecting one of the selectable characters from the menu in response to the operation by a player.

29. A game system as set forth in claim 21, said unit further managing said plurality of characters on a single time axis and, when switching the display from the role played out from the at least one character to the other character, making the other character play out the second role in accordance with the second role to be played out on the same time axis.

30. A game system as set forth in claim 29, in which the memory stores in advance the second role to be played by the other character on the same time axis.

* * * * *

UNITED STATES PATENT AND TRADEMARK OFFICE
CERTIFICATE OF CORRECTION

PATENT NO.    : 6,299,535 B1
DATED         : October 9, 2001
INVENTOR(S)   : M. Tanaka It is certified that error appears in the above-identified patent and that said Letters Patent is hereby corrected as shown below:

Column 14,
Line 2, "range action" should be -- range of action --.
Line 45, "where in" should be -- wherein --; and "swithched" should be -- switched --.

Signed and Sealed this

Eleventh Day of June, 2002

*Attest:*

*Attesting Officer*

JAMES E. ROGAN
*Director of the United States Patent and Trademark Office*